United States Patent
Anderson et al.

(10) Patent No.: US 10,671,533 B2
(45) Date of Patent: *Jun. 2, 2020

(54) FAST CACHE DEMOTIONS IN STORAGE CONTROLLERS WITH METADATA

(71) Applicant: INTERNATIONAL BUSINESS MACHINES CORPORATION, Armonk, NY (US)

(72) Inventors: Kyler A. Anderson, Sahuarita, AZ (US); Kevin J. Ash, Tucson, AZ (US); Lokesh M. Gupta, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/244,579

(22) Filed: Jan. 10, 2019

(65) Prior Publication Data

US 2019/0163634 A1 May 30, 2019

Related U.S. Application Data

(63) Continuation of application No. 15/678,579, filed on Aug. 16, 2017, now Pat. No. 10,210,086.

(51) Int. Cl.
| | |
|---|---|
| *G06F 12/08* | (2016.01) |
| *G06F 12/0831* | (2016.01) |
| *G06F 12/0871* | (2016.01) |
| *G06F 12/0866* | (2016.01) |
| *G06F 12/0808* | (2016.01) |

(52) U.S. Cl.
CPC ...... *G06F 12/0831* (2013.01); *G06F 12/0808* (2013.01); *G06F 12/0866* (2013.01); *G06F 12/0871* (2013.01); *G06F 2212/604* (2013.01); *G06F 2212/621* (2013.01); *G06F 2212/7207* (2013.01)

(58) Field of Classification Search
None
See application file for complete search history.

(56) References Cited

U.S. PATENT DOCUMENTS

| | | | | |
|---|---|---|---|---|
| 6,988,171 | B2 * | 1/2006 | Beardsley | .......... G06F 11/1435 707/999.202 |
| 2003/0051113 | A1 | 3/2003 | Beardsley et al. | |

(Continued)

OTHER PUBLICATIONS

U.S. Appl. No. 15/678,579, filed Aug. 16, 2017, pp. 31.

(Continued)

*Primary Examiner* — Kaushikkumar M Patel
(74) *Attorney, Agent, or Firm* — Janaki K. Davda; Konrad Raynes Davda & Victor LLP

(57) ABSTRACT

Provided are techniques for fast cache demotions in storage controllers with metadata. A track in a demotion structure is selected. In response to determining that the track in the demotion structure does not have invalidate metadata set, demoting the track from cache. In response to determining that the track has invalidate metadata set, the track is moved from the demotion structure to an invalidate metadata structure. One or more tasks are created to process the invalidate metadata structure, wherein each of the one or more tasks selects a different track in the invalidate metadata structure, invalidates metadata for that track, and demotes that track.

20 Claims, 10 Drawing Sheets

(56) References Cited

U.S. PATENT DOCUMENTS

| | | |
|---|---|---|
| 2006/0106971 A1 | 5/2006 | Mahar et al. |
| 2008/0071992 A1 | 3/2008 | Chetuparambil et al. |
| 2009/0049265 A1 | 2/2009 | Candelaria et al. |
| 2010/0191925 A1 | 7/2010 | Blount et al. |
| 2011/0087837 A1 | 4/2011 | Blinick et al. |
| 2013/0185489 A1* | 7/2013 | Benhase ............... G06F 12/123 711/103 |
| 2014/0304479 A1 | 10/2014 | Benhase et al. |
| 2015/0378925 A1 | 12/2015 | Misra |
| 2016/0299848 A1 | 10/2016 | Grusy et al. |
| 2017/0052898 A1 | 2/2017 | Ash et al. |
| 2017/0139841 A1 | 5/2017 | Ash et al. |

OTHER PUBLICATIONS

Notice of Allowance dated Oct. 2, 2018, pp. 13, for U.S. Appl. No. 15/678,579, pp. 13.
List of IBM Patents and Applications Treated as Related dated Jan. 10, 2019, pp. 2.

* cited by examiner

FAST CACHE DEMOTIONS IN STORAGE CONTROLLERS WITH METADATA

BACKGROUND

1. Field of the Invention

Embodiments of the invention relate to fast cache demotions in storage controllers with metadata.

2. Description of the Related Art

A storage controller is coupled to cache and to storage, which is divided into volumes. The storage may be a Redundant Array of Independent Disks (RAID) array.

A track in cache may be marked to say "invalidate metadata". The cache cannot demote the tracks marked with "invalidate metadata" without first invalidating that metadata. Cache demotion refers to removing unmodified data from cache to make room in cache. If cache demotion comes across these tracks with "invalidate metadata", then, typically, the cache demotion either 1) skips these tracks or 2) moves them to a Most Recently Used (MRU) end of a list of tracks to avoid encountering them again during the cache demotion.

Count Key Data (CKD) may be described as a data recording format. For CKD volumes in storage, the cache maintains metadata for faster performance. The metadata describes the format of customer data and is used for fast access to the customer data in the CKD volumes. CKD tracks with invalidate metadata set cannot be demoted from cache without first accessing the metadata and marking it invalid. Invalidating the metadata is an expensive operation since the metadata for the track needs to be accessed, which may cause a stage of the metadata from the CKD volume to cache.

However, there are problems with these approaches. If the tracks are skipped, then the next cache demotion that starts at the bottom of the list of tracks will encounter them again. If the tracks are moved to the MRU end of the list of tracks, then the cache demotion will encounter the tracks when it is processing the MRU end and many of the tracks at the MRU end may be the tracks with "invalidate metadata", which creates a deadlock.

SUMMARY

Provided is a computer program product for fast cache demotions in storage controllers with metadata. The computer program product comprises a computer readable storage medium having program code embodied therewith, the program code executable by at least one processor to perform: selecting a track in a demotion structure; in response to determining that the track in the demotion structure does not have invalidate metadata set, demoting the track from cache; and, in response to determining that the track has invalidate metadata set, moving the track from the demotion structure to an invalidate metadata structure and creating one or more tasks to process the invalidate metadata structure, wherein each of the one or more tasks selects a different track in the invalidate metadata structure, invalidates metadata for that track, and demotes that track.

Provided is a computer system for fast cache demotions in storage controllers with metadata. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations comprising: selecting a track in a demotion structure; in response to determining that the track in the demotion structure does not have invalidate metadata set, demoting the track from cache; and, in response to determining that the track has invalidate metadata set, moving the track from the demotion structure to an invalidate metadata structure and creating one or more tasks to process the invalidate metadata structure, wherein each of the one or more tasks selects a different track in the invalidate metadata structure, invalidates metadata for that track, and demotes that track.

Provided is a method for fast cache demotions in storage controllers with metadata. The method comprises: selecting, using a processor of a computer, a track in a demotion structure; in response to determining that the track in the demotion structure does not have invalidate metadata set, demoting the track from cache; and, in response to determining that the track has invalidate metadata set, moving the track from the demotion structure to an invalidate metadata structure and creating one or more tasks to process the invalidate metadata structure, wherein each of the one or more tasks selects a different track in the invalidate metadata structure, invalidates metadata for that track, and demotes that track.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments perform fast cache demotions in storage controllers with metadata.

Figure 1:
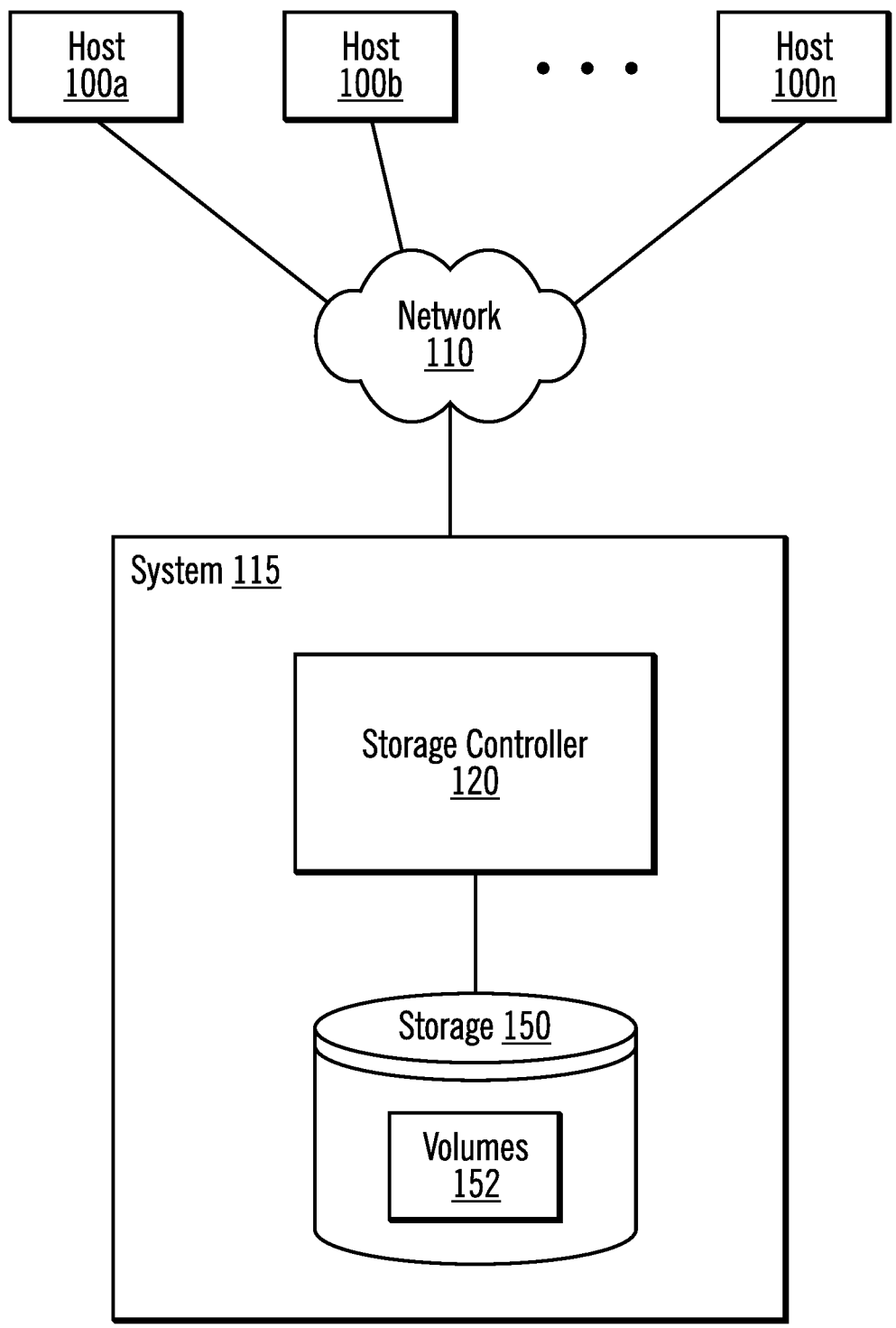
FIG. 1 illustrates, in a block diagram, a computing environment with a storage controller in accordance with certain embodiments.

FIG. 1 illustrates, in a block diagram, a computing environment with a storage controller in accordance with certain embodiments. A plurality of hosts 100a, 100b, . . . 100n are coupled, via a network 110, to a storage controller 120 of a system 115. The plurality of hosts 100a, 100b, . . . 100n may submit Input/Output (I/O) requests to the storage controller (or storage control units) 120 over the network 110 to access data at volumes 152 in storage 150. The volumes may be, for example, Logical Unit Numbers, Logical Devices, Logical Subsystems, etc. The storage 150 may be storage drives. With embodiments, the volumes are CKD volumes.

The system components 100a, 100b, . . . 100n, 120, 150, are connected to the network 110 which enables communication among these components. Thus, the network 110 includes a fabric which may comprise a Storage Area Network (SAN), Local Area Network (LAN), Intranet, the Internet, Wide Area Network (WAN), peer-to-peer network, wireless network, arbitrated loop network, etc. Communication paths from the system 115 to the hosts 100a, 100b, 100n may be based upon a particular host attachment protocol such as Fibre Connection (FICON), for example. Other communication paths of the fabric may comprise for example, a Fibre Channel arbitrated loop configuration, a serial loop architecture or a bus interface, such as a Peripheral Component Interconnect (PCI) interface such as a PCI-Express interface. The communication paths of the fabric may also be part of an Ethernet network, for example, such that each node has an individual network (internet protocol) address. Other types of communication paths may be utilized, such as a modem telephone path, wireless network, etc., depending upon the particular application.

Communication software associated with the communication paths includes instructions and other software controlling communication protocols and the operation of the communication hardware in accordance with the communication protocols, if any. It is appreciated that other communication path protocols may be utilized, depending upon the particular application.

Furthermore, as used herein, the term "unit of storage" or "storage unit" refers to a storage location containing one or more units of data storage capable of storing one or more data units such as one or more volumes, cylinders, tracks, segments, extents, or any portion thereof, or other unit or units of data suitable for transfer.

Figure 2:
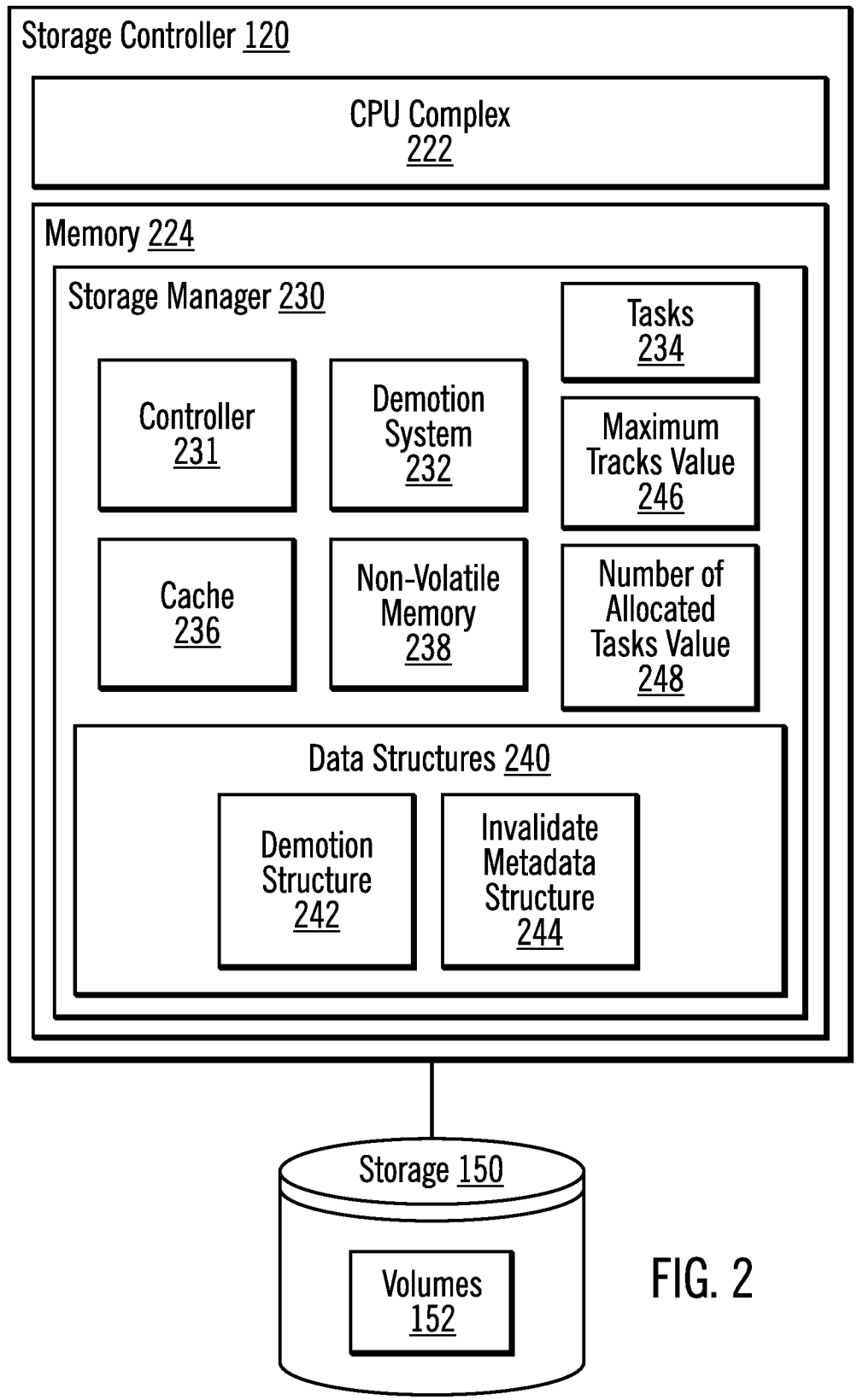
FIG. 2 illustrates, in a block diagram, further details of a storage controller in accordance with certain embodiments.

FIG. 2 illustrates, in a block diagram, further details of a storage controller 120 in accordance with certain embodiments. The storage controller 120 includes a Central Processing Unit (CPU) complex 222, including one or more processors or central processing units, each having a single or multiple processor cores. In certain embodiments, a processor core contains the components of a CPU involved in executing instructions, such as an Arithmetic Logic Unit (ALU), Floating Point Unit (FPU), and/or various levels of cache (such as L1 and L2 cache), for example. It is appreciated that a processor core may have other logic elements in addition to or instead of those mentioned herein.

Also, the storage controller 120 includes a memory 224 that includes a storage manager 230 for managing storage operations (e.g., to store data in the storage 150). The storage manager 230 includes a controller 231 (sometimes referred to as a Least Recently Used (LRU) a demotion system 232, tasks 234, cache 236, non-volatile memory 238, and data structures 240. The cache 236 stores tracks, which may be demoted from the cache 236. The data structures 240 includes a demotion structure 242 (which may also be referred to as a Least Recently Used (LRU) structure) and an invalidate metadata structure 244. With embodiments, the tasks 234 are Task Control Blocks (TCBs). The TCBs perform the required operations to demote tracks from the cache 236. The storage manager 230 also stores a maximum tracks value 246 and a number of allocated tasks value 248. The maximum tracks value 246 keeps track of the number of tracks added to the invalidate metadata structure 244. The number of allocated tasks value 248 keeps track of the number of tasks allocated to process the invalidate metadata structure.

With embodiments, the controller 231 executes the demotion system 232. With embodiments, the controller 231 controls the scans on LRU lists (i.e., the demotion structure 242 and the invalidate metadata structure 244) in the storage controller 120.

With embodiments, the storage manager 230, including the demotion system 232, is depicted as software stored in the memory 224 and executed by the CPU complex 222. However, it is appreciated that the logic functions of the storage manager 230 may be implemented as hardware, software, firmware or combinations of one or more thereof, depending upon the particular application.

The storage 150 may include volumes (e.g., CKD volumes) storing tracks. As used herein, the term track may refer to a track of a disk storage unit, but may also reference to other units of data (or data units) configured in the storage 150 such as a bit, byte, word, segment, page, block (such as a Logical Block Address (LBA)), etc., which may be a part of a larger grouping of data units, such as those stored collectively as a volume, logical device, etc. of data.

In certain embodiments, the storage 150 may be comprised of one or more sequential access storage devices, such as hard disk drives and magnetic tape or may include non-sequential access storage devices, such as Solid State Drives (SSDs), for example. The storage 150 may comprise a single sequential or non-sequential access storage device or may comprise an array of storage devices, such as a Just a Bunch of Disks (JBOD), Direct Access Storage Device (DASD), Redundant Array of Independent Disks (RAID) array, virtualization device, tape storage, flash memory, etc.

Figure 3:
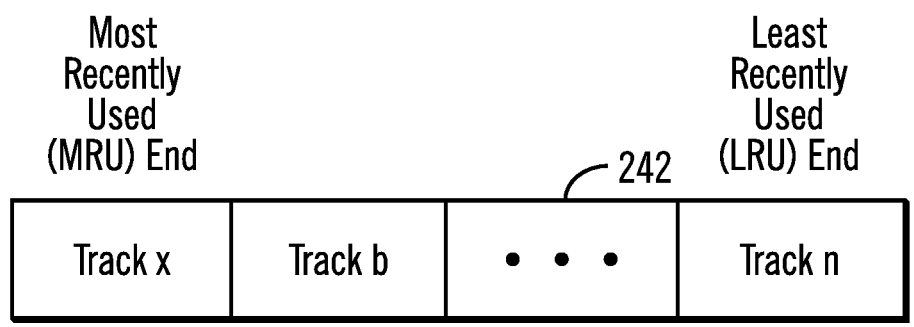
FIG. 3 illustrates details of a demotion structure in accordance with certain embodiments.

FIG. 3 illustrates details of a demotion structure 242 in accordance with certain embodiments. The demotion structure 242 is made up of elements, and each of the elements identifies a track. The demotion structure 242 is organized with elements that indicate tracks that are most recently used to elements that indicate tracks that are least recently used, in order. With embodiments, the demotion structure 242 is an ordered, linear list based on last access time. For example, tracks accessed recently are identified in elements on a Most Recently Used (MRU) end of the list, whereas tracks not accessed in a long time are identified in elements on a Least Recently Used (LRU) end of the list. For example, Track x, on the MRU end, has been accessed more recently than Track n, on the LRU end.

Figure 4:
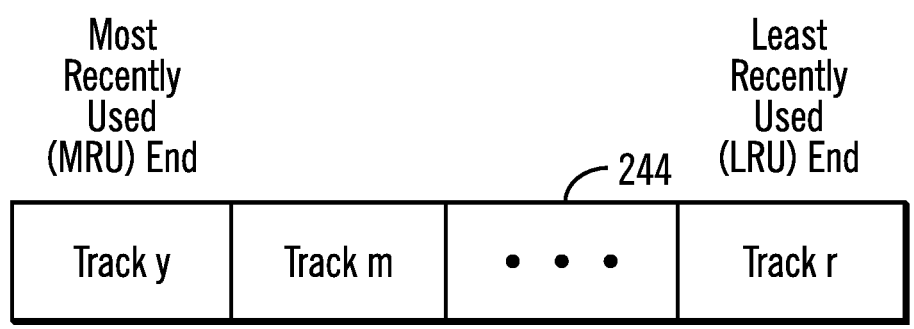
FIG. 4 illustrates details of an invalidate metadata structure in accordance with certain embodiments.

FIG. 4 illustrates details of an invalidate metadata structure 244 in accordance with certain embodiments. The invalidate metadata structure 244 is made up of elements, and each of the elements identifies a track that has invalidate metadata set. The invalidate metadata structure 244 is organized with elements that indicate tracks that are most recently used to elements that indicate tracks that are least recently used, in order. With embodiments, the invalidate metadata structure 244 is an ordered, linear list based on last access time. For example, tracks accessed recently are identified in elements on a Most Recently Used (MRU) end of the list, whereas tracks not accessed in a long time are identified in elements on a Least Recently Used (LRU) end of the list. For example, Track y, on the MRU end, has been accessed more recently than Track r, on the LRU end. In this example of FIGS. 3 and 4, Tracks y, m, and r were originally in the demotion structure 242 with invalidate metadata set, and they were moved to the invalidate metadata structure 244.

With embodiments, the demotion system 232 moves tracks with invalidate metadata set from the demotion structure 242 to the separate, invalidate metadata structure 244. This advantageously leads to more efficient and faster processing of the demotion structure 242. Then, the demotion system 232 creates tasks 234 to process the invalidate metadata structure 244 asynchronously. For each track of the invalidate metadata structure 244, a task 234 invalidates metadata for that track and demotes the track from the cache 236.

Figure 5A:
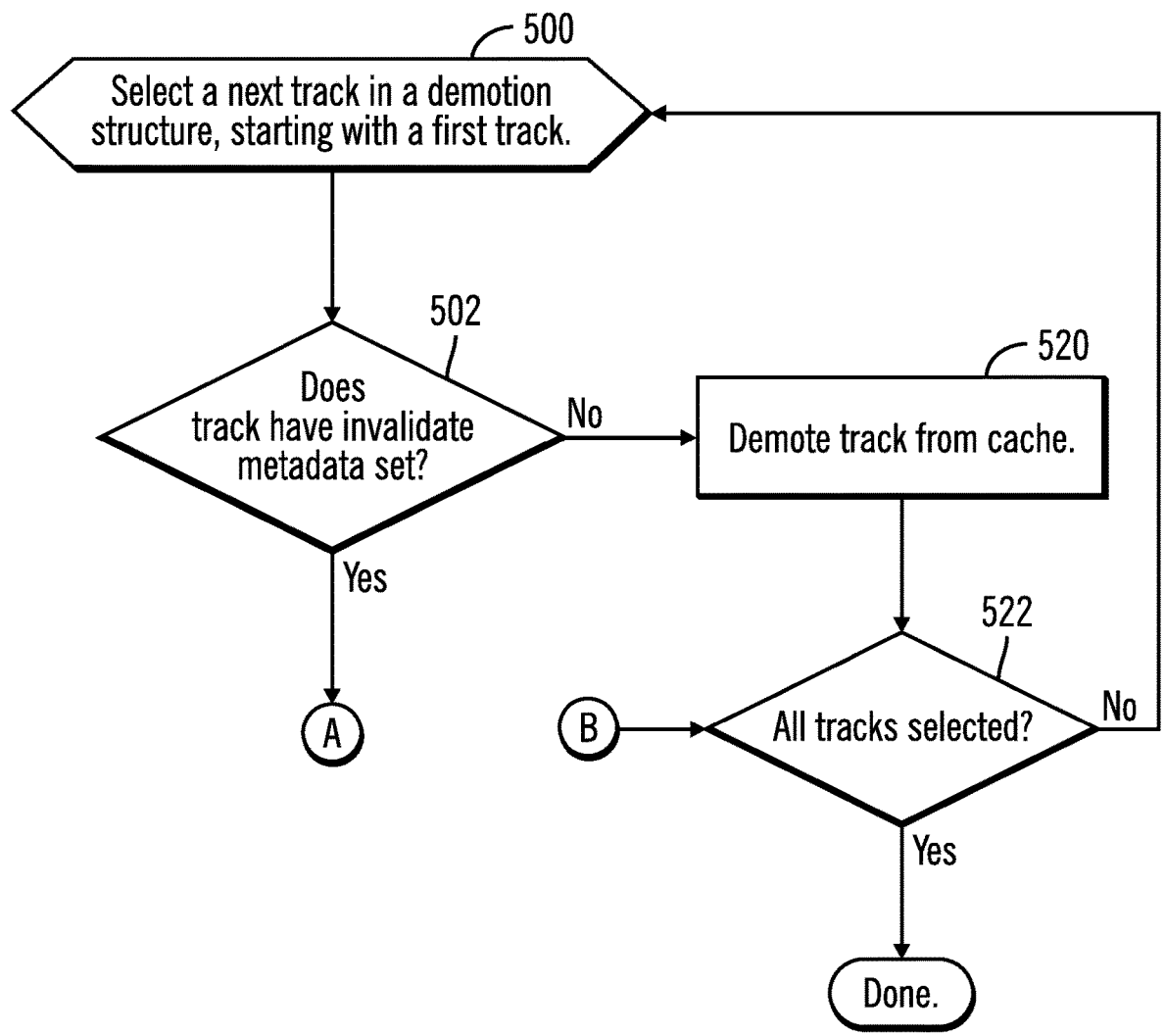
FIGS. 5A, 5B, and 5C illustrate, in a flowchart, operations for demoting tracks in the demotion structure in accordance with certain embodiments.
Figure 5B:
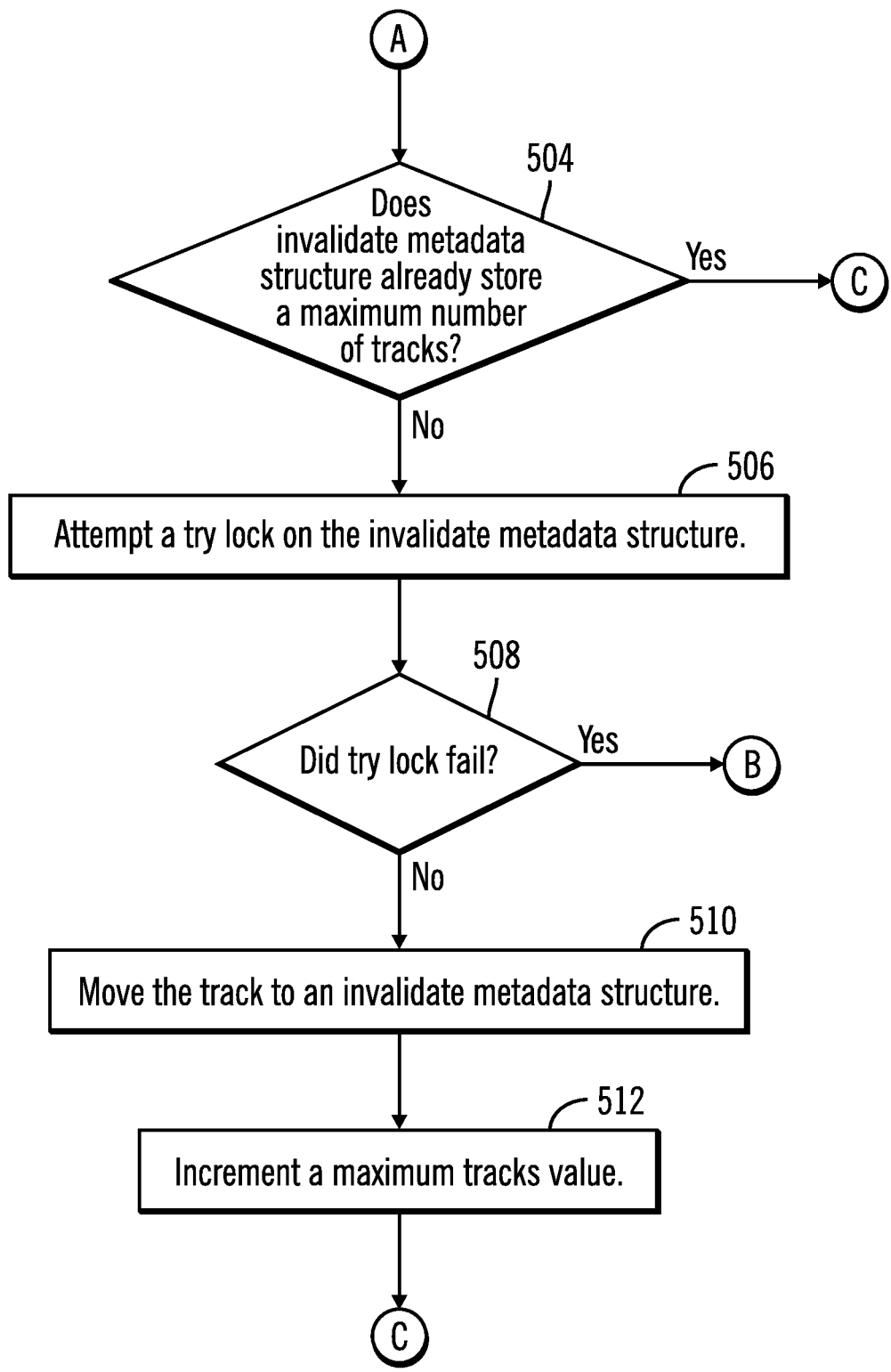
Figure 5C:
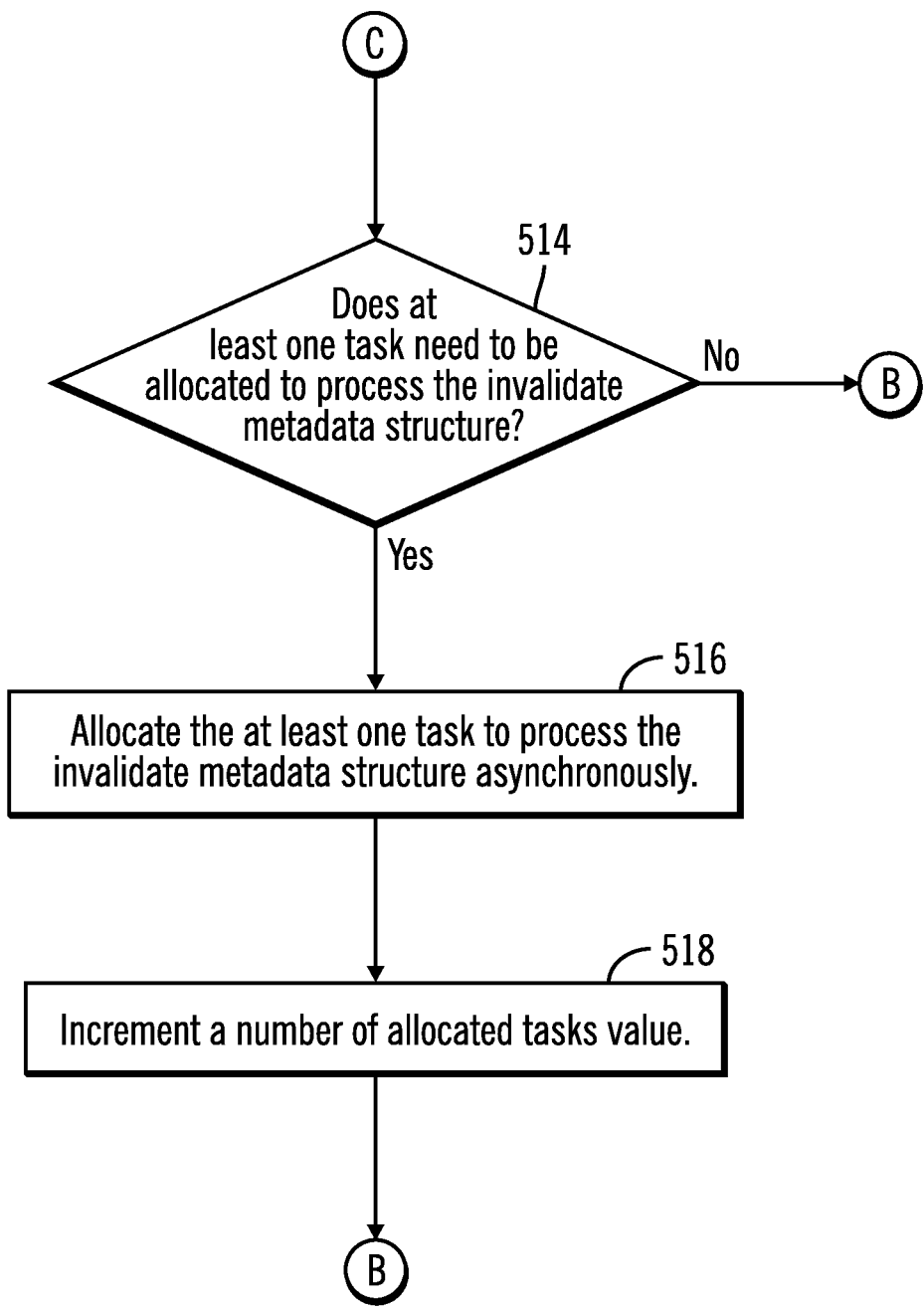

FIGS. 5A, 5B, and 5C illustrate, in a flowchart, operations for demoting tracks in the demotion structure 242 in accordance with certain embodiments. Control begins at block 500 with the demotion system 232 selecting a next track in demotion structure 242, starting with a first track. In block 502, the demotion system 232 determines whether the track has invalidate metadata set. If so, processing continues to block 504 (FIG. 5B), otherwise, processing continues to block 520 (FIG. 5A).

In block 504, the demotion system 232 determines whether the invalidate metadata structure already stores a maximum number of tracks by checking a maximum tracks value 246. If so, processing continues to block 514 (FIG. 5C), otherwise, processing continues to block 506 (FIG. 5B).

In block 506, the demotion system 232 attempts a try lock on the invalidate metadata structure. In block 508, the demotion system 232 determines whether the try lock failed. If so, processing continues to block 522 (FIG. 5A), otherwise, processing continues to block 510 (FIG. 5B).

In block 510, the demotion system 232 moves the track to an invalidate metadata structure 244. In block 512, the demotion system 232 increments a maximum tracks value 246. From block 512 (FIG. 5B), processing continues to block 514 (FIG. 5C).

In block 514, the demotion system 232 determines whether at least one task needs to be allocated to process the invalidate metadata structure 244. If so, processing continues to block 516 (FIG. 5C), otherwise, processing continues to block 522 (FIG. 5A). With embodiments, the demotion system 232 determines the number of tasks to allocate based on various factors, such how many tasks are already processing the invalidate metadata structure 244 and how many tracks are in the invalidate metadata structure 244 (e.g., by checking the maximum tracks value 246). As an example, if no tasks have been allocated to process the invalidate metadata structure 244, then, the demotion system 232 may allocate one or more tasks based on various factors. As another example, if one task is already allocated to process the invalidate metadata structure 244, but there are multiple tracks in the invalidate metadata structure 244, then, the demotion system 232 may allocate one or more additional tasks based on various factors.

In block 516, the demotion system 232 allocates the at least one task to process the invalidate metadata structure 244 asynchronously. Thus, with embodiments, if existing tasks are processing the invalidate metadata structure 244, then the demotion system 232 does not create more tasks. In block 518, the demotion system 232 increments a number of allocated tasks value 248. From block 518, processing continues to block 522 (FIG. 5A).

In block 520 (FIG. 5A), the demotion system 232 demotes the track from the cache 236. In block 522 (FIG. 5A), the demotion system 232 determines whether all tracks have been selected from the demotion structure 242. If no, processing continues to block 500, otherwise, processing is done for this demotion scan. In various other embodiments, other conditions may end a particular demote scan.

Thus, with embodiments, when the demotion system 232 is processing the demotion structure 242, looking for tracks to demote, if the demotion system 232 comes across a track with invalidate metadata set, then, the demotion system 232 moves these tracks to the invalidate metadata structure 244. Then, if there are no tasks processing the invalidate metadata structure 244, the demotion system 232 creates tasks to asynchronously process the invalidate metadata structure 244.

The demotion system 232 also makes sure the LRU controller 231 does not get behind too much by doing a try lock on the invalidate metadata structure 244. If the try lock fails, the demotion system 232 does not move the track during this scan for demotion. A try lock indicates a technique of attempting to take the lock, but failing if not taken immediately (or within a specified number of attempts or tries). So, if another process has the lock, then try lock will fail. If no other process has the lock, then try lock will succeed.

Also, the demotion system 232 makes sure the invalidate metadata structure 244 does not have too many tracks, otherwise, warmstart is elongated. Therefore, the demotion system 232 caps the invalidate metadata structure to hold a maximum number of tasks. With embodiments, the maximum number of tasks may be based on how many tasks may be processed in a fixed amount of time during recovery from an error (e.g., warmstart). Thus, if the invalidate metadata structure 244 has more than the maximum number of tracks (stored in the maximum tracks value 246), the demotion system 232 skips moving the track from the demotion structure 242 to the invalidate metadata structure 244.

Additionally, the demotion system 232 synchronizes processing of the invalidate metadata structure 244 with multiple tasks (one per CPU). With embodiments, synchronization may be done through each of the multiple tasks taking a lock to access the invalidate metadata structure 244.

Figure 6:
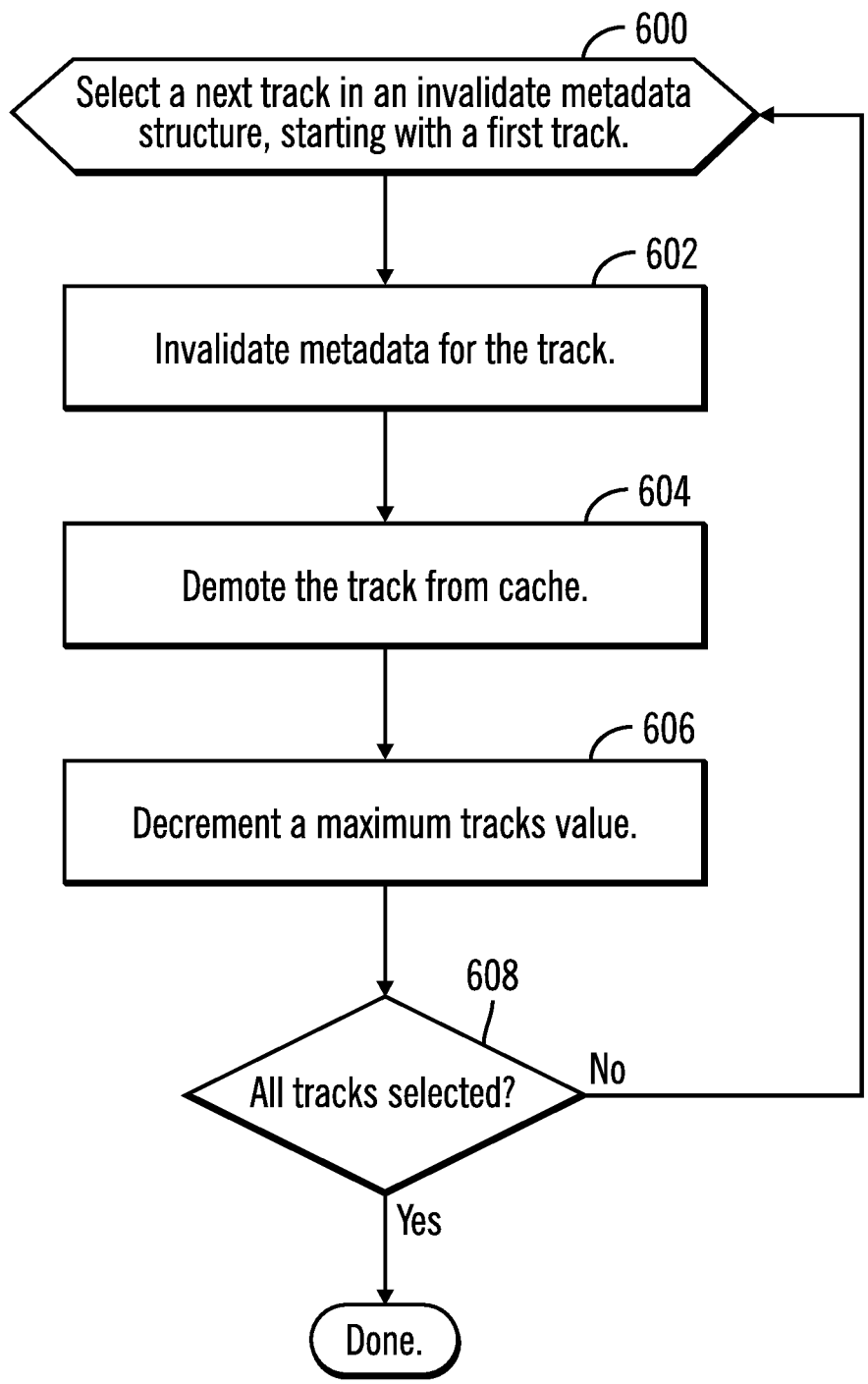
FIG. 6 illustrates, in a flow chart, operations for processing a track in the invalidate metadata structure in accordance with certain embodiments.

FIG. 6 illustrates, in a flow chart, operations for processing a track in the invalidate metadata structure 244 in accordance with certain embodiments. With embodiments, each task allocated to process the invalidate metadata structure 244 performs this processing for one or more tracks.

Control begins at block 600 with a task selecting a next track in an invalidate metadata structure 244, starting with a first track. In block 602, the task invalidates metadata for the track. In block 604, the task demotes the track from the cache 236. In block 606, the task decrements a maximum tracks value. In block 608, the task determines whether all tasks have been selected in the invalidate metadata structure 244. If so, processing is done, otherwise, processing continues to block 600.

Figure 7:
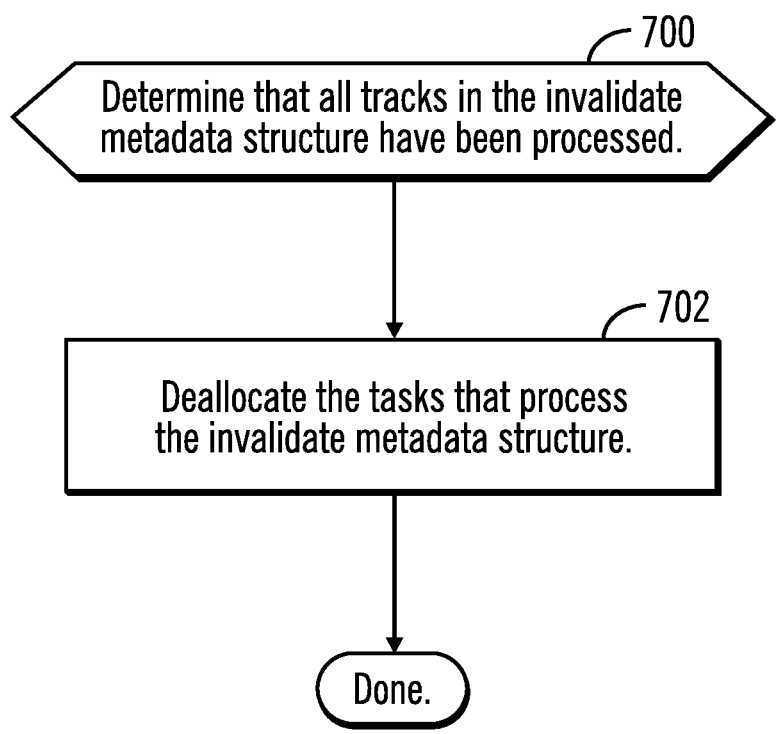
FIG. 7 illustrates, in a flow chart, operations for deallocating tasks in accordance with certain embodiments.

FIG. 7 illustrates, in a flow chart, operations for deallocating tasks in accordance with certain embodiments. Control begins at block 700 with the demotion system 232 determining that all tracks in the invalidate metadata structure 244 have been processed (i.e., the invalidate metadata structure 244 is empty). In block 702, the demotion system 232 deallocates the tasks that process the invalidate metadata structure 244.

Thus, the tasks for processing the invalidate metadata structure 244 are deallocated when the invalidate metadata structure 244 becomes empty.

With embodiments, cache demotion is performed by moving tracks with metadata to be invalidated to a separate Least Recently Used (LRU) list (the invalidate metadata structure 244) at another processor and creating tasks (via a Task Control Block (TCB)) to process the separate, invalidate metadata structure 244 asynchronously to invalidate the metadata and then demote the tracks.

The reference characters used herein, such as n and r are used to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
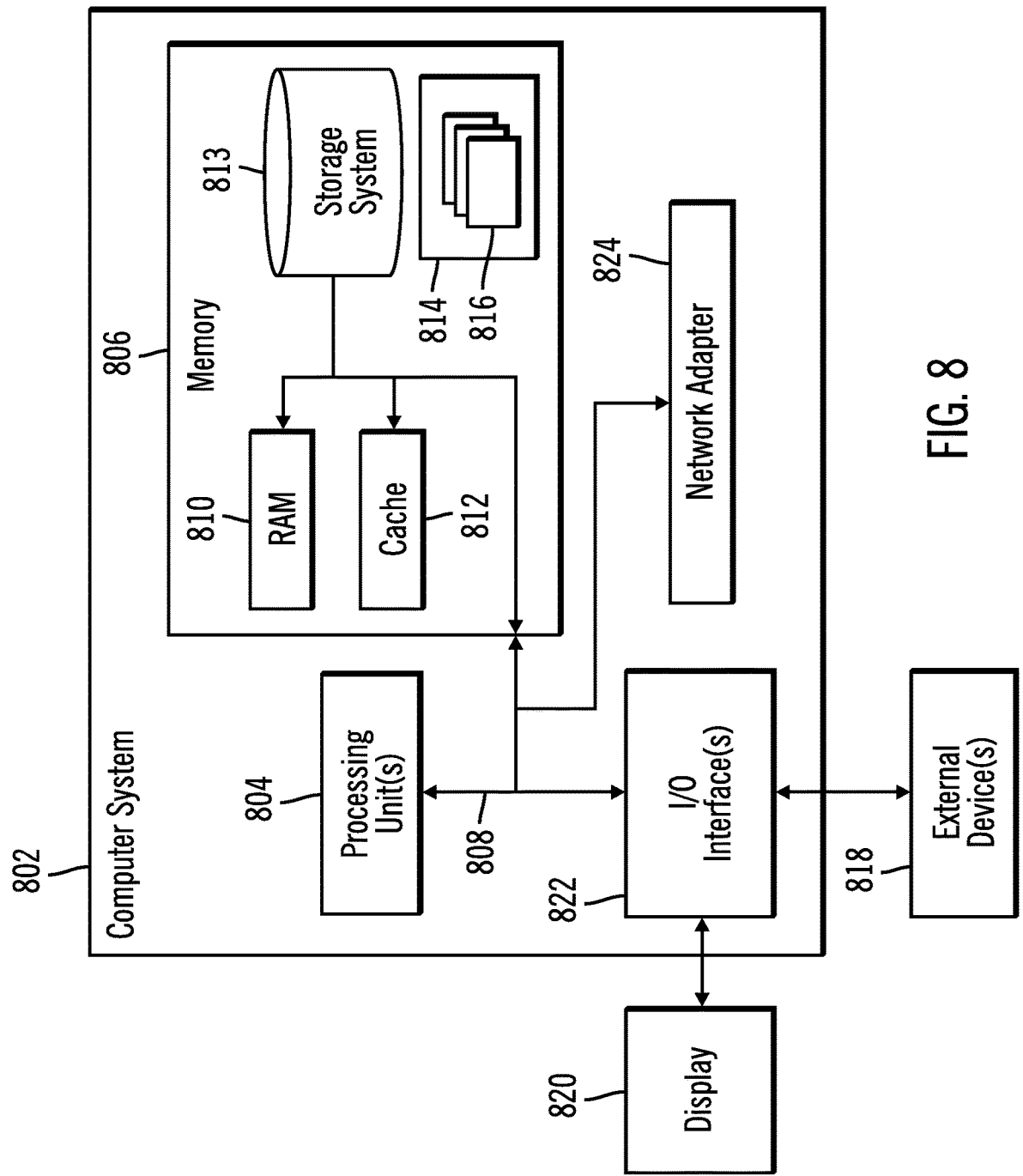
FIG. 8 illustrates a computing architecture in which the components of FIG. 1 may be implemented in accordance with certain embodiments.

FIG. 8 illustrates a computing architecture in which the components of FIG. 1 may be implemented in accordance with certain embodiments. The computational components of FIG. 1, including the hosts 100a, 100b, . . . 100n and the storage controller 120 may implement computer architecture 802. Computer system/server 802 may be described in the general context of computer system executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, the computer system/server 802 is shown in the form of a general-purpose computing device. The components of computer system/server 802 may include, but are not limited to, one or more processors or processing units 804, a system memory 806, and a bus 808 that couples various system components including system memory 806 to processor 804. Bus 808 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media.

System memory 806 can include computer system readable media in the form of volatile memory, such as random access memory (RAM) 810 and/or cache memory 812. Computer system/server 802 may further include other removable/non-removable, volatile/non-volatile computer system storage media. By way of example only, storage system 813 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 808 by one or more data media interfaces. As will be further depicted and described below, memory 806 may include at least one program product having a set (e.g., at least one) of program modules that are configured to carry out the functions of embodiments of the invention.

Program/utility 814, having a set (at least one) of program modules 816, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. The components of the computer 802 may be implemented as program modules 816 which generally carry out the functions and/or methodologies of embodiments of the invention as described herein. The systems of FIG. 1 may be implemented in one or more computer systems 802, where if they are implemented in multiple computer systems 802, then the computer systems may communicate over a network.

Computer system/server 802 may also communicate with one or more external devices 818 such as a keyboard, a pointing device, a display 820, etc.; one or more devices that enable a user to interact with computer system/server 802; and/or any devices (e.g., network card, modem, etc.) that enable computer system/server 802 to communicate with one or more other computing devices. Such communication can occur via Input/Output (I/O) interfaces 822. Still yet, computer system/server 802 can communicate with one or more networks such as a local area network (LAN), a general wide area network (WAN), and/or a public network (e.g., the Internet) via network adapter 824. As depicted, network adapter 824 communicates with the other components of computer system/server 802 via bus 808. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product, the computer program product comprising a computer readable storage medium having program code embodied therewith, the program code executable by at least one processor to perform:
    storing a demotion structure and an invalidate metadata structure;
    determining that a track in the demotion structure has invalidate metadata set;
    determining whether the track is to be moved to the invalidate metadata structure;
    in response to determining that the track is to be moved to the invalidate metadata structure,
        moving the track from the demotion structure to the invalidate metadata structure; and
        creating a task to process the invalidate metadata structure asynchronously by invalidating metadata for the track and demoting the track from cache; and
    in response to determining that the track is not to be moved to the invalidate metadata structure, skipping movement of the track from the demotion structure to the invalidate metadata structure.

2. The computer program product of claim 1, wherein it is determined that the track is not to be moved to the invalidate metadata structure based on determining that the invalidate metadata structure stores a maximum number of tracks.

3. The computer program product of claim 1, wherein it is determined that the track is not to be moved to the invalidate metadata structure based on a try lock on the invalidate metadata structure failing.

4. The computer program product of claim 1, wherein the program code is executable by the at least one processor to perform:
    deallocating the task.

5. The computer program product of claim 1, wherein the program code is executable by the at least one processor to perform:
    in response to determining that a track in the demotion structure does not have invalidate metadata set, demoting the track from cache.

6. The computer program product of claim 1, wherein the invalidate metadata structure is organized with elements that indicate tracks that are most recently used to elements that indicate tracks that are least recently used.

7. The computer program product of claim 1, wherein the demotion structure is organized with elements that indicate tracks that are most recently used to elements that indicate tracks that are least recently used.

8. A computer system, comprising:
    one or more processors, one or more computer-readable memories and one or more computer-readable, tangible storage devices; and
    program instructions, stored on at least one of the one or more computer-readable, tangible storage devices for execution by at least one of the one or more processors via at least one of the one or more memories, to perform operations comprising:
        storing a demotion structure and an invalidate metadata structure;
        determining that a track in the demotion structure has invalidate metadata set;
        determining whether the track is to be moved to the invalidate metadata structure;
        in response to determining that the track is to be moved to the invalidate metadata structure,
            moving the track from the demotion structure to the invalidate metadata structure; and
            creating a task to process the invalidate metadata structure asynchronously by invalidating metadata for the track and demoting the track from cache; and
        in response to determining that the track is not to be moved to the invalidate metadata structure, skipping movement of the track from the demotion structure to the invalidate metadata structure.

9. The computer system of claim 8, wherein it is determined that the track is not to be moved to the invalidate metadata structure based on determining that the invalidate metadata structure stores a maximum number of tracks.

10. The computer system of claim 8, wherein it is determined that the track is not to be moved to the invalidate metadata structure based on a try lock on the invalidate metadata structure failing.

11. The computer system of claim 8, wherein the operations further comprise:
    deallocating the task.

12. The computer system of claim 8, wherein the operations further comprise:
    in response to determining that a track in the demotion structure does not have invalidate metadata set, demoting the track from cache.

13. The computer system of claim 8, wherein the invalidate metadata structure is organized with elements that indicate tracks that are most recently used to elements that indicate tracks that are least recently used.

14. The computer system of claim 8, wherein the demotion structure is organized with elements that indicate tracks that are most recently used to elements that indicate tracks that are least recently used.

15. A computer-implemented method, comprising:
    storing a demotion structure and an invalidate metadata structure;
    determining that a track in the demotion structure has invalidate metadata set;
    determining whether the track is to be moved to the invalidate metadata structure;
    in response to determining that the track is to be moved to the invalidate metadata structure,
        moving the track from the demotion structure to the invalidate metadata structure; and creating a task to process the invalidate metadata structure asynchronously by invalidating metadata for the track and demoting the track from cache; and in response to determining that the track is not to be moved to the invalidate metadata structure, skipping movement of the track from the demotion structure to the invalidate metadata structure.

16. The computer-implemented method of claim 15, wherein it is determined that the track is not to be moved to the invalidate metadata structure based on determining that the invalidate metadata structure stores a maximum number of tracks.

17. The computer-implemented method of claim 15, wherein it is determined that the track is not to be moved to the invalidate metadata structure based on a try lock on the invalidate metadata structure failing.

18. The computer-implemented method of claim 15, further comprising:
deallocating the task.

19. The computer-implemented method of claim 15, further comprising:
in response to determining that a track in the demotion structure does not have invalidate metadata set, demoting the track from cache.

20. The computer-implemented method of claim 15, wherein the invalidate metadata structure is organized with elements that indicate tracks that are most recently used to elements that indicate tracks that are least recently used.

* * * * *